US011812480B2

(12) United States Patent
Tirronen et al.

(10) Patent No.: US 11,812,480 B2
(45) Date of Patent: Nov. 7, 2023

(54) INDICATION OF USER EQUIPMENT REPLY TO EARLY DATA TRANSMISSION

(71) Applicant: Telefonaktiebolaget LM Ericsson (publ), Stockholm (SE)

(72) Inventors: Tuomas Tirronen, Helsinki (FI); Emre Yavuz, Stockholm (SE); Andreas Höglund, Solna (SE); Dung Pham Van, Upplands Väsby (SE); Luca Feltrin, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 18 days.

(21) Appl. No.: 17/598,020

(22) PCT Filed: Mar. 26, 2020

(86) PCT No.: PCT/IB2020/052871
§ 371 (c)(1),
(2) Date: Sep. 24, 2021

(87) PCT Pub. No.: WO2020/194235
PCT Pub. Date: Oct. 1, 2020

(65) Prior Publication Data
US 2022/0167433 A1 May 26, 2022

Related U.S. Application Data

(60) Provisional application No. 62/825,470, filed on Mar. 28, 2019.

(51) Int. Cl.
*H04W 74/08* (2009.01)
*H04W 76/30* (2018.01)
(Continued)

(52) U.S. Cl.
CPC ... *H04W 74/0841* (2013.01); *H04W 28/0268* (2013.01); *H04W 68/005* (2013.01); *H04W 76/30* (2018.02)

(58) Field of Classification Search
CPC ............. H04W 74/0841; H04W 76/30; H04W 28/0268; H04W 68/005
See application file for complete search history.

(56) References Cited

U.S. PATENT DOCUMENTS

2019/0104553 A1* 4/2019 Johansson ......... H04W 74/0833
2019/0223221 A1* 7/2019 Johansson ............. H04W 68/02
(Continued)

FOREIGN PATENT DOCUMENTS

| CN | 108702784 A | 10/2018 |
| WO | 2019031427 A1 | 2/2019 |
| WO | 2020194235 A1 | 10/2020 |

OTHER PUBLICATIONS

3GPP, "3rd Generation Partnership Project; Technical Specification Group Core Network and Terminals; Non-Access-Stratum (NAS) protocol for Evolved Packet System (EPS); Stage 3 (Release 15)", 3GPP TS 24.301 V15.5.0, Dec. 2018, 1-536.
(Continued)

*Primary Examiner* — Ajay Cattungal
(74) *Attorney, Agent, or Firm* — Murphy, Bilak & Homiller, PLLC

(57) ABSTRACT

A UE operating in a wireless network receives a paging message from the wireless network and performs a random access procedure in response to the paging message, where performing the random access procedure includes sending an indication of whether the UE will transmit a reply to an early data transmission from the wireless network to the UE. The network receives, as part of a random access procedure performed by the UE in response to the paging message, an
(Continued)

indication of whether the UE will transmit a reply to an early data transmission from the wireless network to the UE.

26 Claims, 13 Drawing Sheets

(51) Int. Cl.
*H04W 28/02* (2009.01)
*H04W 68/00* (2009.01)

(56) References Cited

U.S. PATENT DOCUMENTS

| | | | |
|---|---|---|---|
| 2022/0015038 A1* | 1/2022 | Shi | H04W 52/0274 |
| 2022/0104169 A1* | 3/2022 | Kim | H04W 72/27 |
| 2022/0132616 A1* | 4/2022 | Pham Van | H04W 68/005 |

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.4.0, Dec. 2018, 1-131.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.4.0, Dec. 2018, 1-363.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.4.0, Dec. 2018, 1-933.

Unknown, Author, "Mapping of MT EDT Use cases to Solution Options", 3GPP TSG RAN WG2 Meeting #105, R2-1900319, Athens, Greece, Feb. 26-Mar. 1, 2019, 1-5.

Unknown, Author, "Mobile-terminated Early Data Transmission", 3GPP TSG-RAN WG2 Meeting #105, R2-1900998, Athens, Greece, Feb. 25-Mar. 1, 2019, 1-5.

Unknown, Author, "Remaining issues in Early Data Transmission", 3GPP TSG-RAN WG2 #102 R2-1807325, Busan, Korea, May 21-25, 2018, 1-5.

Unknown, Author, "Mobile terminated early data transmission", Institute for Information Industry (III), 3GPP TSG-RAN WG2 Meeting#103, R2-1814351, Chengdu, China, Oct. 8-12, 2018, 1-5.

\* cited by examiner

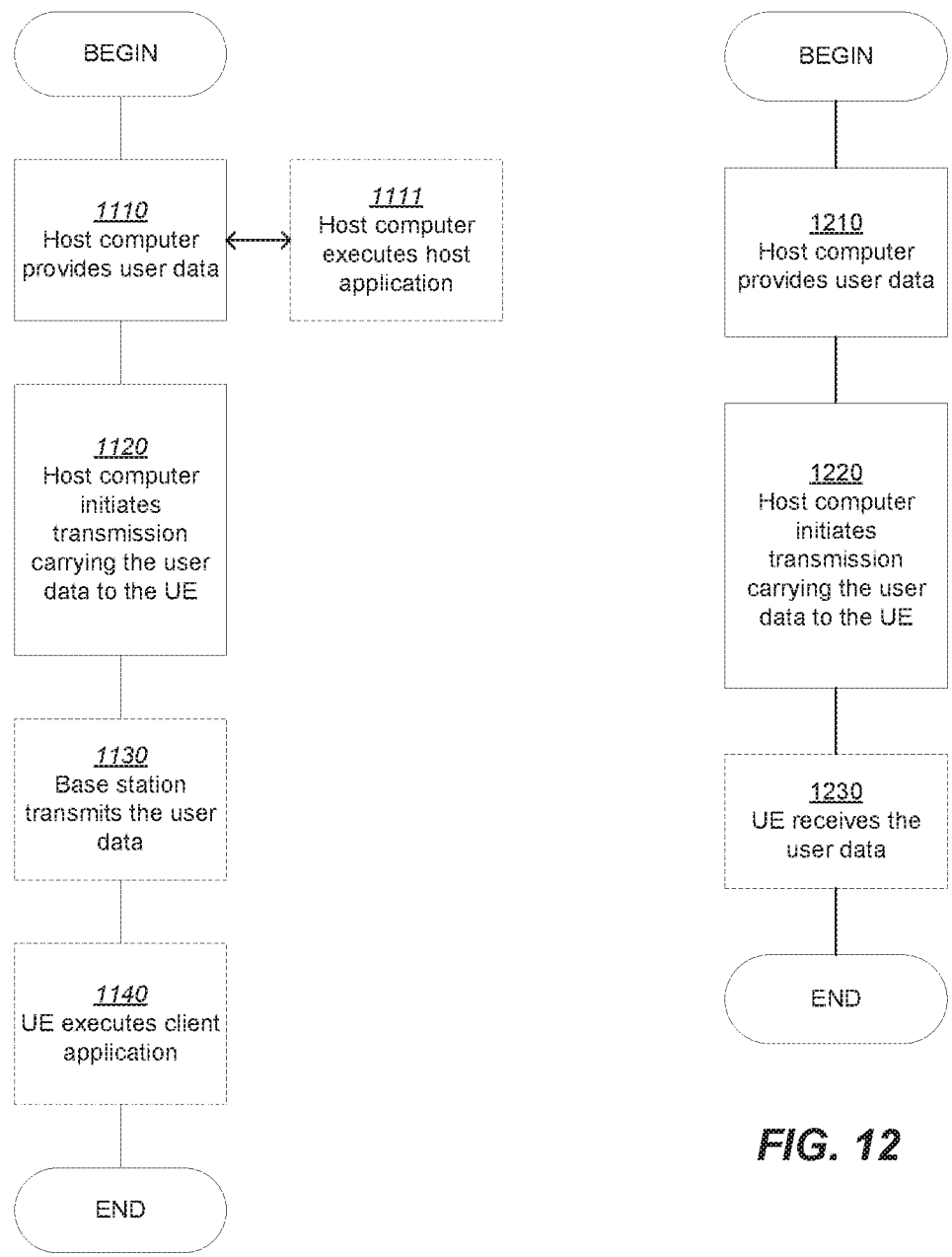

INDICATION OF USER EQUIPMENT REPLY TO EARLY DATA TRANSMISSION

TECHNICAL FIELD

The present disclosure generally relates to the field of wireless network communications, and more particularly, to techniques for indicating whether a UE will transmit a reply to an early data transmission (EDT) from the wireless network to the UE.

BACKGROUND

3GPP efforts have specified technologies to cover use cases related to Machine-to-Machine (M2M) and/or Internet of Things (IoT) applications. Work for 3GPP Release 13 and 14 includes enhancements to support Machine-Type Communications (MTC) with new user equipment (UE) categories (Cat-M1, Cat-M2), supporting reduced bandwidth of up to 6 and 24 physical resource blocks (PRBs), respectively, and Narrowband IoT (NB-IoT) UEs providing a new radio interface (UE categories Cat-NB1 and Cat-NB2).

Long Term Evolution (LTE) enhancements introduced in 3GPP Release 13, 14, and 15 for MTC may be referred to as "eMTC" (for "enhanced MTC"), including (not limiting) support for bandwidth limited UEs, Cat-M1, and support for coverage enhancements. This is to separate discussions from NB-IoT (notation here used for any Release), although the supported features are similar on a general level.

For both eMTC and NB-IoT, "CIoT EPS UP optimizations" and "CIoT EPS CP optimizations" signaling reductions were also introduced in Release 13, where "CIoT" stands for "Cellular IoT," "UP" stands for "user plane." "CP" stands for "control plane," and "EPS" stands for "Evolved Packet Subsystem." The former, here referred to as the UP-solution, allows the UE to resume a previously suspended Radio Resource Control (RRC) connection. Thus, this signaling or solution is also known as RRC Suspend/Resume.

The CIoT EPS CP optimizations, here referred to as the CP-solution, allow the transmission of user-plane data over non-access stratum (NAS) (aka DoNAS, i.e., "data over NAS").

In 3GPP Release 15, a feature referred to as early data transmission (EDT) was introduced for eMTC and NB-IoT UEs. With EDT, the UE can send data in Msg3 during a random access procedure, and possibly receive data following in Msg4. This is in contrast to legacy operation where data transmission would take place only after the connection has been setup, i.e., at the earliest in Msg5, which finalizes the RRC connection setup or resume. Examples of EDT for UP-solution and CP-solution are illustrated in FIGS. 1 and 2, respectively. These figures are the same as in 3GPP TS 36.300 in Section 7.3b, where further information regarding EDT can be found. Further EDT details are specified then in 3GPP TS 36.321 (i.e., medium access control (MAC) protocol specification) and 3GPP TS 36.331 (i.e., RRC protocol specification).

The intention of EDT is to reduce UE power consumption by reducing the number of signaling messages needed to transmit small data. This is typically achieved by the eNB releasing the UE immediately to RRC idle mode after the data has been transmitted. In Release 15 mobile-originating (MO) EDT, this means the UE would be released to RRC idle in Msg4 (e.g., using RRCConnectionRelease message, see 3GPP TS 36.331). However, in the event that the eNB knows or assumes there will be further transmissions in either downlink or uplink, it can also move the UE to RRC connected mode to wait for possible further transmissions after the UE has triggered EDT.

Release 15 focused only on the uplink-triggered or mobile originated (MO) EDT, i.e., on the case where the UE has small data that it wants to transmit as efficiently as possible. In Release 16, the intention is to specify mobile-terminated (MT) EDT, i.e., the case where the network (e.g., application server somewhere on the internet) wants to send data to the UE in an optimized way—that is, well before Msg6, as would be the earliest possible time if the legacy procedures (RRC connection setup or resume) would be followed.

SUMMARY

Release 16 may involve improved downlink (DL) transmission efficiency and/or UE power consumption for eMTC and NB-IoT. This may involve support for MT EDT for both CP and UP solutions. The intention to use MT-EDT is for user data. i.e., not for NAS signaling.

MT EDT provides advantages with respect to battery life, network resource efficiency, security, reliability and potential impact on core network. MT EDT is intended for downlink data that can be transmitted in one transport block. Use cases that require downlink data transmission with or without UL data transmission as a response should be supported for MT EDT.

One option for improved efficiency is to include or indicate downlink data transmission after the preamble transmission, i.e., in Msg2 or after Msg2. Another option is to include or indicate the downlink data transmission in Msg4 or after Msg4 transmission. The latter option is similar to the MO EDT specified in Release 15, but in a form where there would not be uplink transmission in Msg3. Instead, the first user data transmission would be in Msg4 in downlink. Possible solutions for specifying MT EDT are focused on providing the downlink data either during or after Msg2 transmission or during or after Mgs4 transmission. It has not previously been defined how the eNB would have the information for knowing if it should move the UE to connected mode, be prepared to receive UE transmission in uplink, or provide the UE with scheduling information for uplink following the initial MT transmission.

There are two different approaches to how the eNB might understand it should move the UE to RRC connected mode or otherwise prepare to receive a reply message for MT EDT. In one approach, the UE indicates whether it will transmit a reply in response to the initial downlink transmission, either during or after preamble transmission, or in Msg3 transmission that it assumes. This may be by using existing signaling with a new interpretation, for example, using buffer status reporting procedure with new interpretation, or re-using non-access stratum release assistance indicator (NAS RAI), or using the "cause" field in an RRC message sent to request connection establishment/resume in Msg3. This may also be done by introducing new signaling mechanism for LIE to indicate potential reply after downlink transmission, i.e., an indication in physical, MAC or RRC layers, e.g., preamble partitioning, using a reserved/spare bit(s) in downlink control information (DCI), medium access control (MAC) subheader or MAC control element (CE), or an RRC message to request connection establishment/resume in Msg.3. In another approach, the eNB/MME or, in general, a network node, makes a prediction whether the UE will transmit a reply after the initial downlink transmission.

Several of the embodiments described in detail below involve the first approach. It is assumed the UE has some information on whether it intends to reply to an MT EDT transmission or not. This information should reach the radio protocols, e.g., from the application layer.

There may be a mechanism for the UE to indicate to the network regarding potential data to be transmitted in the uplink in response to the received transmission in the downlink, i.e., MT EDT. This would help the eNB to either move the UE to connected mode or provide some means for uplink transmission.

According to some embodiments, a method in a UE, operating in a wireless network, includes receiving a paging message from the wireless network and performing a random access procedure in response to the paging message, where performing the random access procedure includes sending an indication of whether the UE will transmit a reply to an EDT from the wireless network to the UE.

According to some embodiments, a method in a network node operating in a wireless network includes sending a paging message to a UE and receiving, as part of a random access procedure performed by the UE in response to the paging message, an indication of whether the UE will transmit a reply to an EDT from the wireless network to the UE.

Further aspects of the present invention are directed to an apparatus, network node, base station, wireless device, UE, network devices, computer program products or computer readable storage medium corresponding to the methods summarized above and functional implementations of the above-summarized network node and wireless device.

Embodiments of the invention enable UEs to indicate to a network node during MT EDT if the UE expects to reply to the received MT data transmission, in order to provide eNB/network information if uplink data is expected.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIGS. 11 to 14 are flowcharts illustrating example methods implemented in a communication system including a host computer, a base station and a user equipment.

DETAILED DESCRIPTION

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment. Any two or more embodiments described in this document may be combined with each other. The embodiments are described with respect to LTE or New Radio (NR), but can be adapted in other radio access technologies (RATs) where the techniques or selections may be relevant.

The present disclosure uses the terms "Msg2," "Msg3," "Msg4," etc. These refer to the sequence of messages exchanged between the UE and the base station (e.g., eNB or gNB) as defined by 3GPP specifications. While the present disclosure may describe certain modifications to the contents of these messages, the term "Msg3," for example, should be understood as referring to the third message in this well-known sequence of messaging, while "Msg4" refers to the next message, etc.

Embodiments of the present invention involve a UE that receives a paging message from the wireless network and performs a random access procedure in response to the paging message, where performing the random access procedure includes sending an indication of whether the UE will transmit a reply to an EDT from the wireless network to the UE. The network receives, as part of a random access procedure performed by the UE in response to the paging message, an indication of whether the UE will transmit a reply to an EDT from the wireless network to the UE.

The embodiments described herein enable UEs to indicate to a network node, during mobile-terminated EDT, whether the UE expects to reply to the received MT data transmission, in order to provide eNB/network information if uplink data is expected. The indications may include a buffer status report (BSR), access stratum release assistance indication (AS RAI) and non-access stratum (NAS) RAI related embodiments, or other indications.

The embodiments are described in terms of LTE and EPC network, but similar embodiments can be extended to apply in other cellular wireless technologies, especially in 5G or NR and 5GC related specifications.

Figure 3:
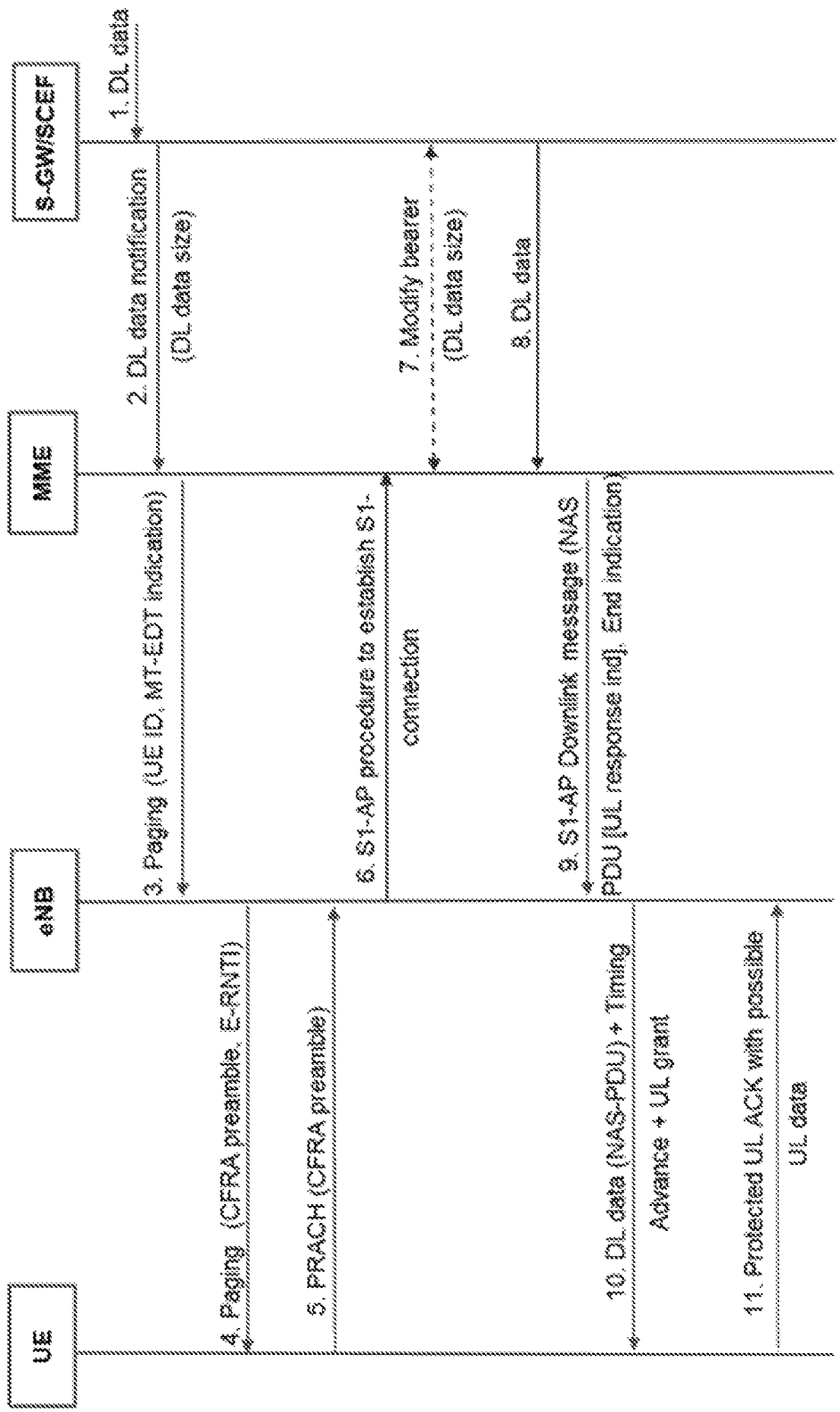
FIG. 3 illustrates an example of signaling flow for MT CP-EDT.

Embodiments may cover at least two different alternative ways to do MT EDT. Some embodiments may include indicating a UE reply in case of Msg2-based MT EDT (i.e., data after preamble transmission focused mechanisms). Other embodiments may include methods for indicating UE reply in case of Msg4-based MT EDT. In Msg2-based MT EDT there is a mechanism where it is possible to send UL data after receiving the DL transmission even without specific eNB knowledge on if UE would send such transmission or not. FIG. 3 is an example of a signaling flow for MT CP-EDT after preamble/Msg2.

The network may treat the UE differently depending on if it has data to transmit after the MT EDT (step 10 in the Figure), i.e., adjust the sizes of the uplink grants and/or release to UE to Idle earlier (e.g., multiplexing the RRC Connection Release message in step 10 in the most extreme case). In this case legacy or new indication could be included in "Msg3" (step 11 in the Figure) to indicate there is more uplink data to transmit in the uplink.

Figure 4:
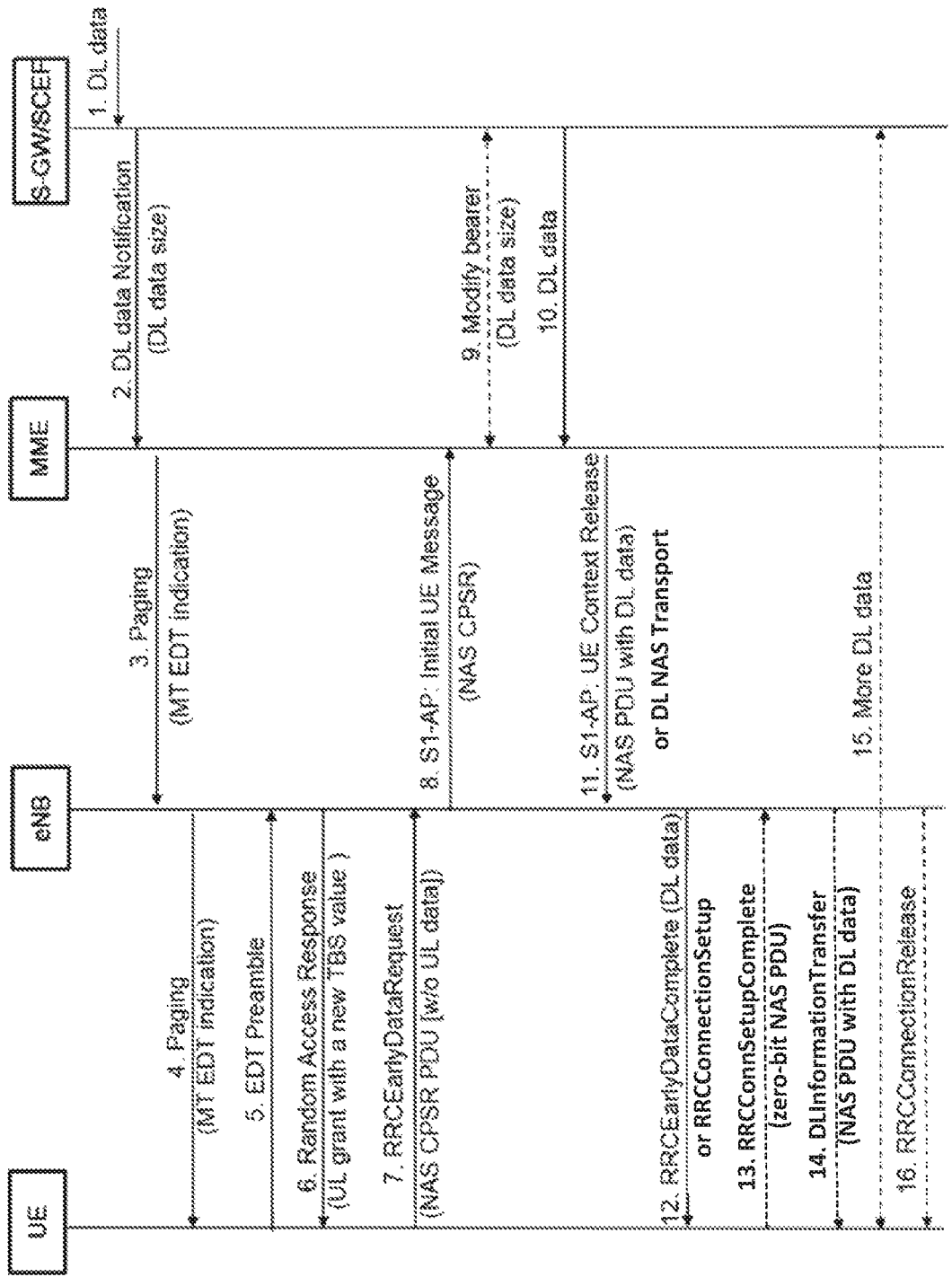
FIG. 4 illustrates another example of signaling flow for MT CP-EDT.
Figure 5:
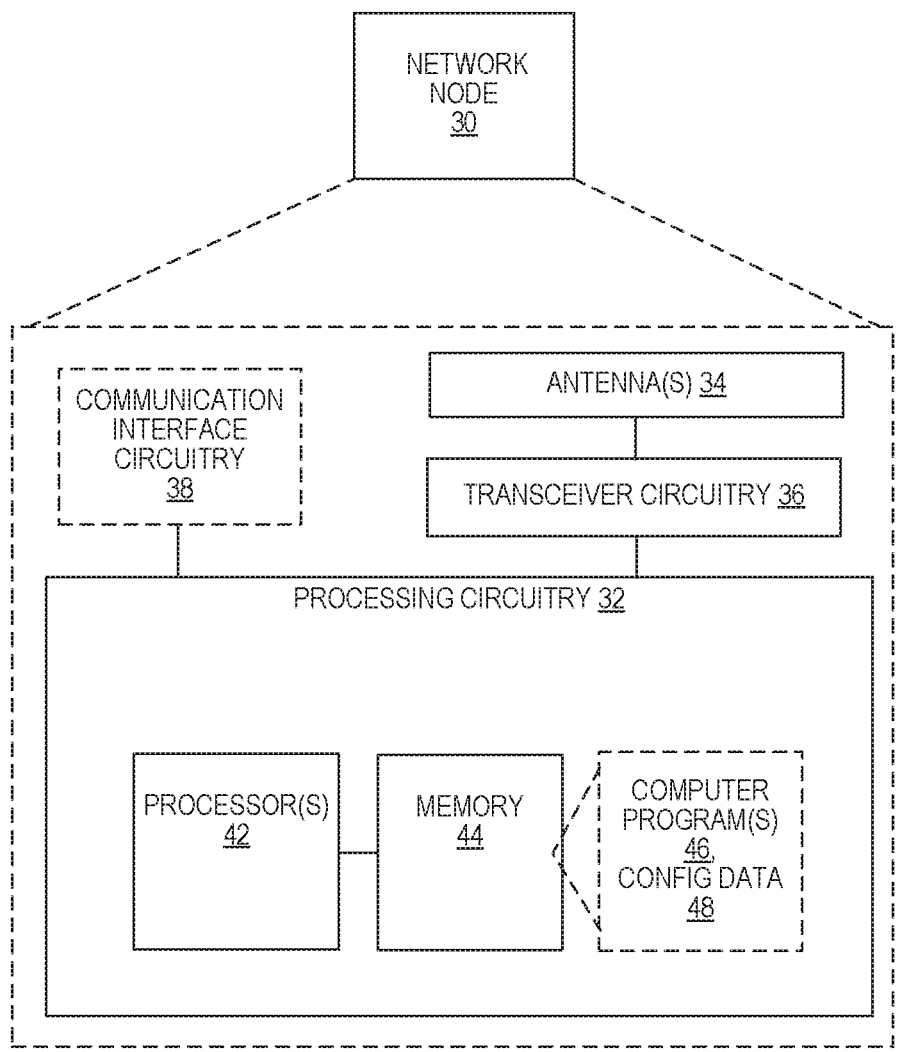
FIG. 5 illustrates a block diagram of a network node, according to some embodiments.

FIG. 4 illustrates another signaling flow for MT CP-EDT. As shown in the figure, the UE first receives paging message with an implicit/explicit indication for MT-EDT, then sends a preamble (either explicitly signaled to the UE in the paging message or using for example preambles configured for Rel-15 EDT or configured for Rel-16 MT-EDT (via partitioning), or a new configuration for Rel-16 MT EDT). As a prerequisite for an indication to work (in step 3), the UE needs to understand that the MT transmission is using EDT. One way to indicate this is to have a flag in a paging message indicating MT EDT.

In case the network (MME/eNB) expects an uplink response to downlink data, e.g., uplink ACK without relying on an uplink indication from the UE, it can already indicate this to the UE via the paging message. Since the network will move the UE to RRC_CONNECTED mode, with such a downlink indication the UE does not need to send an indication as in step 3 below. Also, the network does not need to send another downlink indication as in step 4 below. The downlink indication can be in form of a flag bit in the paging message similar to the MT-EDT indication mentioned above. An eNB sends Msg2, including a random access response or similar information containing scheduling information for Msg3 transmission.

The UE sends Msg3, but no user data in this case. Msg3 may contain an indication for potential reply after reception of MT data as described herein. Note this can also apply to Msg2-based case presented earlier.

Msg4 contains the MT data transmission that initially triggered the network to page the UE for MT EDT. Based on either the indication received in Msg3 or other information to let the network know if there is an uplink response after downlink data, the UE is either released to idle or moved to connected mode accordingly, the latter of which would make it possible for the UE to transmit in the uplink as a response to the data received in Msg4. In addition, the network may indicate in Msg4 that an uplink response to downlink data in Msg4 is needed.

Msg5 transmission may contain uplink reply to the MT data transmission received in Msg4. If the UE has indicated in Msg3 that a single transmission is to follow, the network may release the UE to idle in Msg6.

The procedure is finished after Msg6, which releases the UE to RRC idle mode, or later, in the event that there are further transmissions in uplink or downlink.

Figure 1:
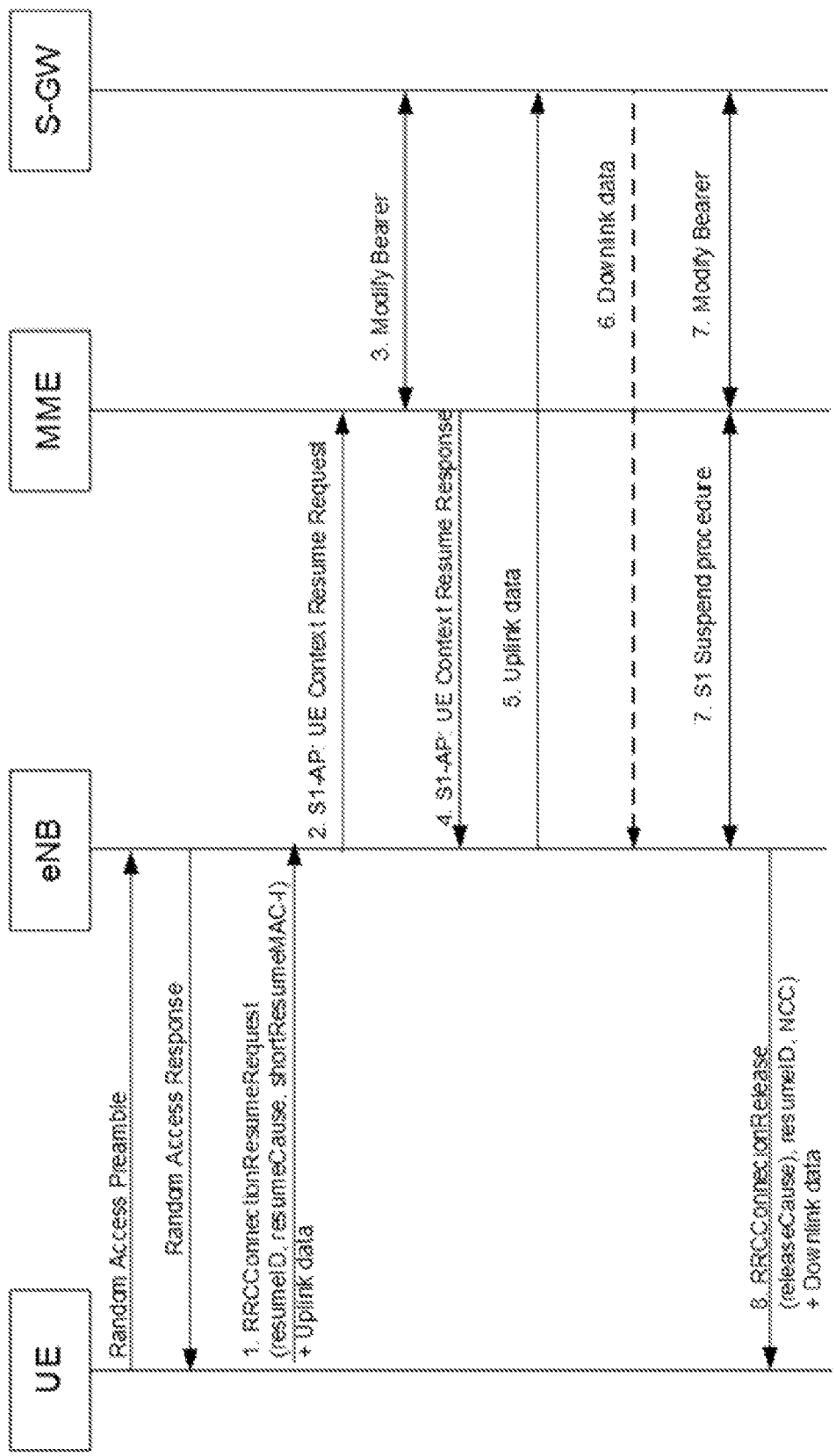
FIG. 1 illustrates EDT for user plane CIoT optimization.
Figure 2:
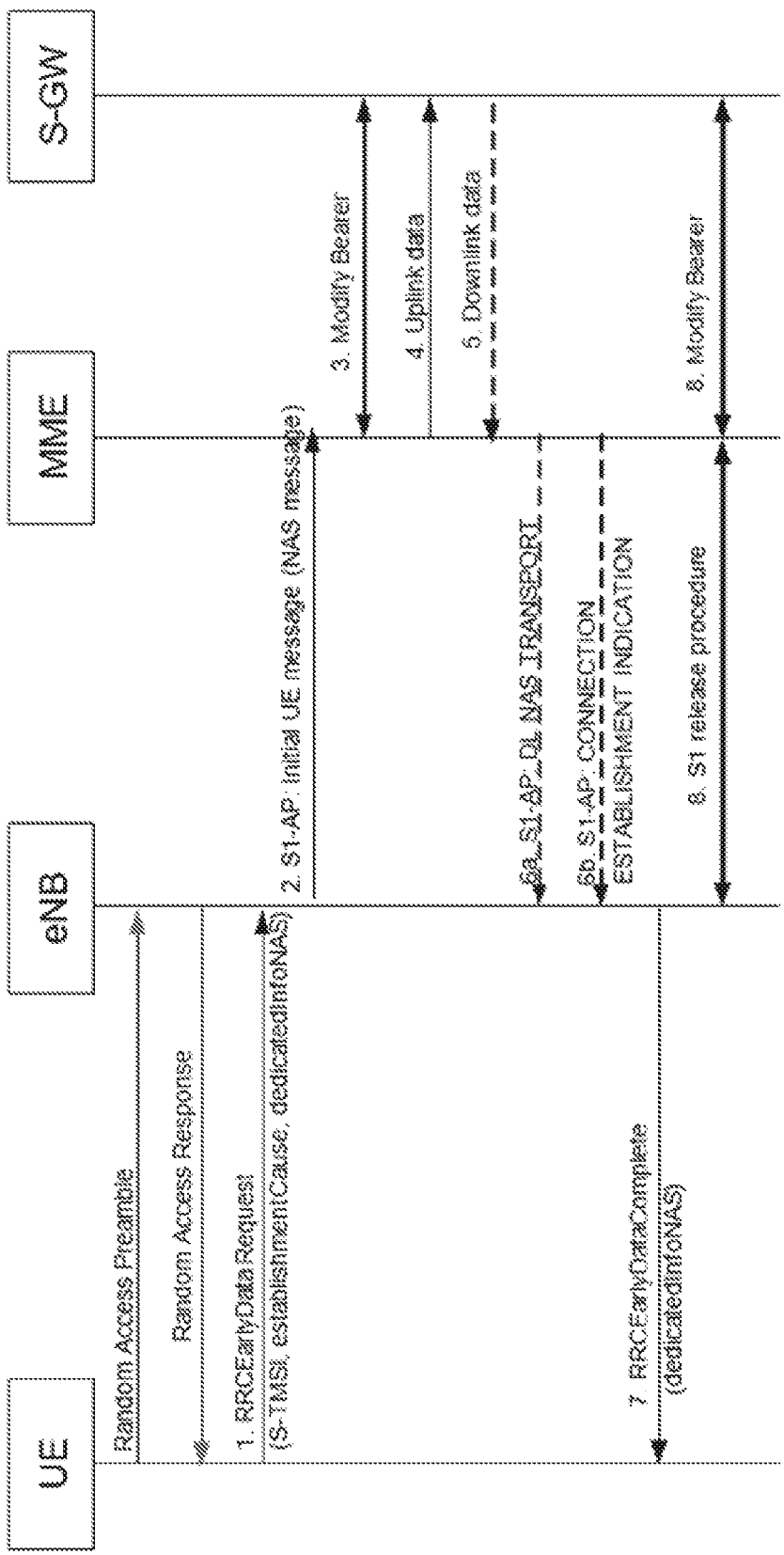
FIG. 2 illustrates EDT for control plane CIoT optimization.

As for the UE reply indication, the indication mentioned in step 3 in Msg4-based MT EDT (in FIG. 2, step 7), or step 11. In FIG. 1 above, for Msg2-based MT EDT, the indication can be any of the several possibilities described below.

First, the included indication may be a BSR in Msg3, for example, indicating possibility of uplink transmission after receiving the MT data. In prior solutions, if rai-Activation has been configured by the RRC layer, the UE would cancel the pending BSR if there is no data to be sent, i.e., the BSR would not be sent according to the configuration. In this case, in these embodiments, the UE would send BSR=0 anyway (i.e. regardless of the configuration), and the eNB would then understand, based on BSR=0 and the fact that MT EDT is triggered, that the UE wishes to send uplink response after downlink data transmission.

In an alternative embodiment, some code point other than BSR=0 is used to indicate that UE wishes to send an uplink reply. e.g., any value >0. This is contrary to legacy behavior, where the BSR would indicate the size of the data in buffer, but there would be no data in this case.

In an alternative embodiment, BSR=0 means the UE does not wish to send an uplink reply. In this case, if the UE acts according to rai-Activation, i.e., it does not send anything, the eNB/network assumes, based on absence of BSR, that the UE wishes to transmit a reply in uplink.

In prior solutions, if rai-Activation has not been configured, the UE can, according to existing procedures, send BSR=0 in Msg3. However, in this case, the network would not understand that UE may have a reply for the MT data, as the UE would act according to well-known behavior. Thus, in this case, the UE could indicate BSR>0, even if it does not have any data in buffer at this point, in order for the network to move UE to connected mode or to provide resources for further uplink transmission after Msg4 has been sent in downlink.

Another approach to include an indication may include defining a new AS RAI indication corresponding to NAS RAI, with one or more codepoints. One of the defined codepoints indicates UE expects to send an uplink reply to an initial MT EDT transmission. AS RAI can be defined for, example, in MAC or RRC protocol. e.g., as a MAC control element (CE).

For CP EDT, the existing NAS RAI (cf. TS 24.301, section 9.9.4.25) could be used to indicate to MME that UE is likely to send uplink data after receiving the MT data. However, the existing codepoints in NAS RAI do not include such option. In one embodiment, the 'reserved' value is used for this purpose. In an alternative embodiment, one of the other existing values is re-used, and in this MT EDT context this value would indicate an uplink transmission as a reply to a downlink MT EDT transmission.

RAI values for NAS RAI are shown in Table 1 (Table 9.9.4.25.1: Release assistance indication information element from TS 24.301).

TABLE 1

Release assistance indication value
Downlink data expected (DDX)

| Bits | | |
|---|---|---|
| 2 | 1 | |
| 0 | 0 | No information regarding DDX is conveyed by the information element. If received it shall be interpreted as 'neither value "01" nor "10" applies' |
| 0 | 1 | No further uplink or downlink data transmission subsequent to the uplink data transmission is expected |
| 1 | 0 | Only a single downlink data transmission and no further uplink data transmission subsequent to the uplink data transmission is expected |
| 1 | 1 | reserved |

Bits 3 and 4 of octet 1 are spare and shall be encoded as zero.

One such reinterpretation could for example be the following Table 2.

TABLE 2

| Bits | | |
|---|---|---|
| 2 | 1 | |
| 0 | 0 | No information regarding DDX is conveyed by the information element. If received it shall be interpreted as 'neither value "01" nor "10" applies' |
| 0 | 1 | No further uplink (or downlink) data transmission subsequent to the downlink data transmission is expected |
| 1 | 0 | Only a single uplink data transmission (and no further downlink data) transmission subsequent to the downlink data transmission is expected |
| 1 | 1 | Multiple uplink data transmissions, and/or further downlink data transmission subsequent to the downlink data transmission is expected |

Another approach to including an indication may include introducing a new MAC control element or using a reserved/spare bit(s) in an existing MAC subheader or MAC CE, which indicates possibility to reply with uplink data after receiving the MT data. Alternatively, use a Logical Channel ID (LCID) value and transmit a MAC subheader for the indication.

An indication may be a reserved/spare bit(s) in DCI that indicates possibility to reply with UL data after receiving the MT data.

An indication may be in an RRC message included in Msg3, in the form of a cause field, e.g., the 'establishment cause'. Typically for MT originated transmission, the establishment/resume cause would be 'mt-Access', but in this case the UE would change this and use 'mo-Data' instead to indicate to the network/eNB that UE may reply to the downlink transmission with uplink transmission. Both 'mo-Data' and 'mt-Access' are existing definitions in TS 36.331. In one embodiment, a dedicated preamble is provided in the paging message so that the intention is clearly indicated to the network. i.e., responding to a paging message with initiating access with establishment cause "mo-Data". In an alternative embodiment, a new establishment cause is defined for indicating an uplink reply for MT EDT.

An indication may be a new field in the RRC message included in Msg3 indicating possibility for an uplink reply. For example, this may involve extending RRCConnectionResumeRequest or EarlyDataRequest RRC messages with field 'ul-Reply' with boolean values true/false.

It may be assumed that the UE has some information on whether it intends to reply to MT EDT transmission or not. This information should reach the radio protocols, e.g., from the application layer, and this kind of interaction is not typically specified in 3GPP.

In some cases, an early indication from the UE may be required. In one embodiment, two contention-free random access (CFRA) preambles can be provided to the UE in the paging (step 4 in the Figure), and a pre-configured mapping is applied such that one of the preambles correspond to one RAI value and the other to another RAI value. The UE may then select which CFRA preamble to use for the preamble transmission in Msg1 (step 5 in the Figure) to provide the information to the network. For example, the first listed CFRA preamble could mean "no UL data transmission expected" and the second listed CFRA preamble could mean "UL data transmission expected." This embodiment can be generalized to more CFRA preambles (~code points) and more combinations for RAI values.

The "UE reply" above could be generalized to one or a combination of the following alternatives. Following MT EDT transmission, the following is uplink activity that is expected: a) no uplink transmission; b) (smaller) uplink data that can be finished in one transmission; c) (larger) uplink data that requires multiple uplink transmissions.

FIG. 3 shows an example network node 30 that may be configured to help a wireless device or UE carry out one or more of these disclosed techniques. Network node 30 may be an evolved Node B (eNodeB), Node B or gNB. While a network node 30 is shown in FIG. 3, the operations can be performed by other kinds of network access nodes, including a radio network node such as base station, radio base station, base transceiver station, base station controller, network controller, NR BS, Multi-cell/multicast Coordination Entity (MCE), relay node, access point, radio access point, Remote Radio Unit (RRU) Remote Radio Head (RRH), or a multi-standard BS (MSR BS).

In the non-limiting embodiments described below, network node 30 will be described as being configured to operate as a cellular network access node in an LTE network or NR network. In some embodiments, the technique can be implemented in the RRC layer. The RRC layer could be implemented by one or more network nodes in a cloud environment and hence some embodiments can be implemented in a cloud environment.

Those skilled in the art will readily appreciate how each type of node may be adapted to carry out one or more of the methods and signaling processes described herein, e.g., through the modification of and/or addition of appropriate program instructions for execution by processing circuits 32.

Network node 30 facilitates communication between wireless terminals (e.g., UEs), other network access nodes and/or the core network. Network node 30 may include communication interface circuitry 38 that includes circuitry for communicating with other nodes in the core network, radio nodes, and/or other types of nodes in the network for the purposes of providing data and/or cellular communication services. Network node 30 communicates with wireless devices using antennas 34 and transceiver circuitry 36. Transceiver circuitry 36 may include transmitter circuits, receiver circuits, and associated control circuits that are collectively configured to transmit and receive signals according to a radio access technology, for the purposes of providing cellular communication services.

Network node 30 also includes one or more processing circuits 32 that are operatively associated with the transceiver circuitry 36 and, in some cases, the communication interface circuitry 38. Processing circuitry 32 comprises one or more digital processors 42, e.g., one or more microprocessors, microcontrollers, Digital Signal Processors (DSPs). Field Programmable Gate Arrays (FPGAs). Complex Programmable Logic Devices (CPLDs), Application Specific Integrated Circuits (ASICs), or any mix thereof. More generally, processing circuitry 32 may comprise fixed circuitry, or programmable circuitry that is specially configured via the execution of program instructions implementing the functionality taught herein, or some mix of fixed and programmed circuitry. Processor 42 may be multi-core, i.e., having two or more processor cores utilized for enhanced performance, reduced power consumption, and more efficient simultaneous processing of multiple tasks.

Processing circuitry 32 also includes a memory 44. Memory 44, in some embodiments, stores one or more computer programs 46 and, optionally, configuration data 48. Memory 44 provides non-transitory storage for the computer program 46 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, memory 44 comprises any one or more of SRAM. DRAM. EEPROM, and FLASH memory, which may be in processing circuitry 32 and/or separate from processing circuitry 32. Memory 44 may also store any configuration data 48 used by the network access node 30. Processing circuitry 32 may be configured, e.g., through the use of appropriate program code stored in memory 44, to carry out one or more of the methods and/or signaling processes detailed hereinafter.

Processing circuitry 32 of network node 30 is configured, according to some embodiments, to send a paging message to a UE and receive, as part of a random access procedure performed by the UE in response to the paging message, an indication of whether the UE will transmit a reply to an EDT from the wireless network to the UE.

Figure 6:
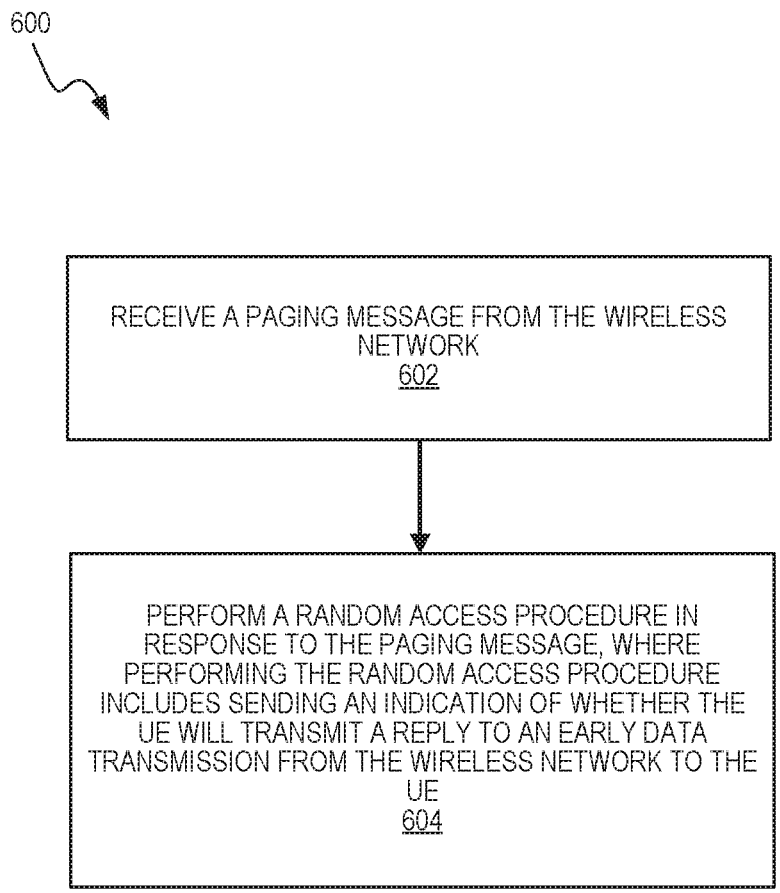
FIG. 6 illustrates a flowchart illustrating a method in the network node, according to some embodiments.

Processing circuitry 32 is also configured to perform a corresponding method, such as method 600 in FIG. 6. Method 600 includes sending a paging message to a UE (block 602) and receiving, as part of a random access procedure performed by the UE in response to the paging message, an indication of whether the UE will transmit a reply to an EDT from the wireless network to the UE (block 604). The paging message may include an indication of an MT EDT.

In some embodiments, receiving the indication of whether the UE will transmit a reply to the EDT includes determining whether the UE will transmit a reply to the EDT based on a random access preamble used by the UE in the random access procedure. The receiving may also include receiving the indication in Msg3 of the random access procedure. Receiving the indication in Msg3 of the random access procedure may include receiving a BSR in the Msg3, the codepoint of the BSR indicating whether the UE will transmit a reply to the EDT. Receiving the indication in Msg3 of the random access procedure may include receiving an RAI in the Msg3, the codepoint of the RAI indicating whether the UE will transmit a reply to the EDT. Receiving the indication in Msg3 of the random access procedure may include receiving an establishment cause field in the Msg3, the establishment cause information element indicating whether the UE will transmit a reply to the EDT. Receiving the indication in Msg3 of the random access procedure may include receiving a dedicated field in the Msg3, the dedicated field element whether the UE will transmit a reply to the EDT. Receiving the indication in Msg3 of the random access procedure may also include receiving the indication in a MAC subheader or CE.

In some embodiments, method 600 includes sending the EDT to the UE and, responsive to determining, based on the indication, that the UE will transmit a reply to the EDT, setting an uplink grant size that takes into account that the UE will transmit a reply to the EDT. In other embodiments, method 600 includes sending the EDT to the UE and, responsive to determining, based on the indication, that the UE will not transmit a reply to the EDT, releasing the UE to idle state in a same message that includes the EDT. In some embodiments, method 600 includes sending the EDT to the UE in a Msg4 of the random access procedure, receiving the reply to the EDT after the Msg4 and releasing the UE to idle immediately after receiving the reply to the EDT, in response to determining that the indication that the UE will transmit a reply to the EDT indicates that only a single transmission by the UE will follow the EDT.

Figure 7:
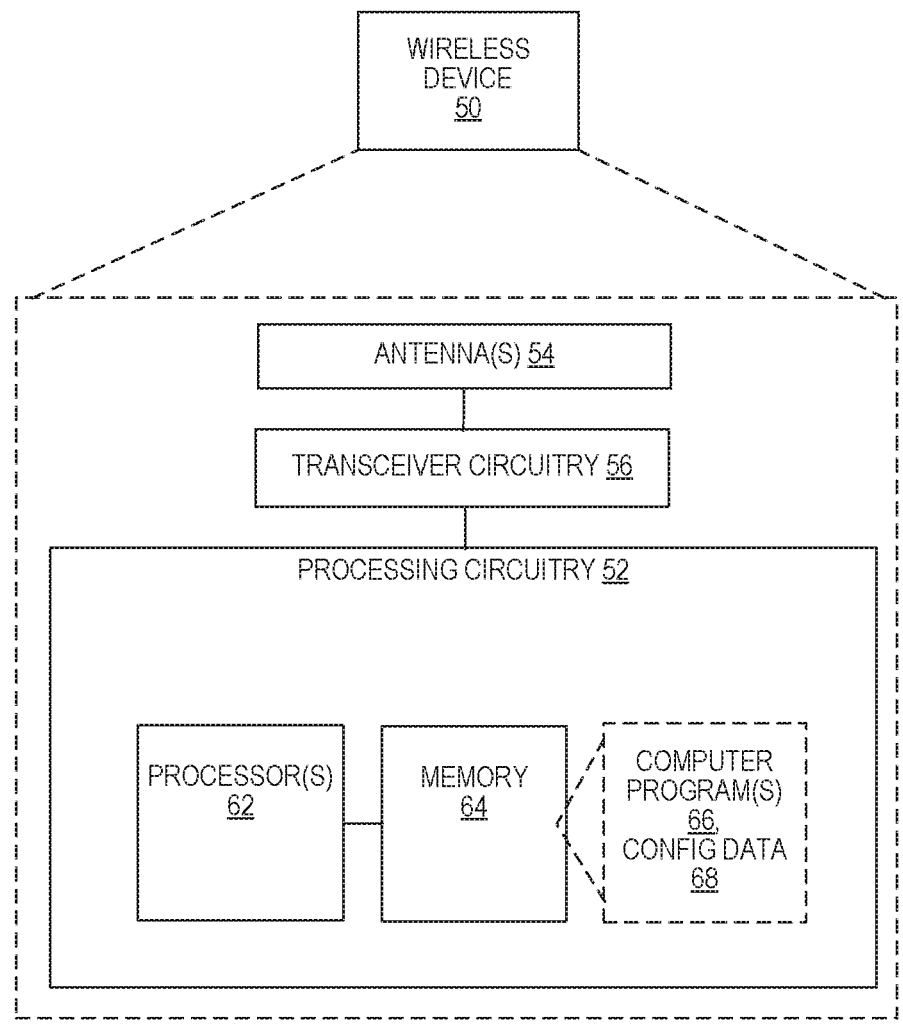
FIG. 7 illustrates a block diagram of a wireless device, according to some embodiments.

FIG. 7 illustrates a diagram of a wireless device 50 configured to carry out the techniques described above for the wireless device 50, according to some embodiments. Wireless device 50 may be considered to represent any wireless devices or terminals that may operate in a network, such as a UE in a cellular network as in the techniques described above. Other examples may include a communication device, target device, MTC device, IoT device, device to device (D2D) UE, machine type UE or UE capable of machine to machine communication (M2M), a sensor equipped with UE, PDA (personal digital assistant), tablet, IPAD tablet, mobile terminal, smart phone, laptop embedded equipped (LEE), laptop mounted equipment (LME). USB dongles. Customer Premises Equipment (CPE), etc.

Wireless device 50 is configured to communicate with a network node or base station in a wide-area cellular network via antennas 54 and transceiver circuitry 56. Transceiver circuitry 56 may include transmitter circuits, receiver circuits, and associated control circuits that are collectively configured to transmit and receive signals according to a radio access technology, for the purposes of using cellular communication services.

Wireless device 50 also includes one or more processing circuits 52 that are operatively associated with the radio transceiver circuitry 56. Processing circuitry 52 comprises one or more digital processing circuits. e.g., one or more microprocessors, microcontrollers, DSPs, FPGAs, CPLDs. ASICs, or any mix thereof. More generally, processing circuitry 52 may comprise fixed circuitry, or programmable circuitry that is specially adapted via the execution of program instructions implementing the functionality taught herein, or may comprise some mix of fixed and programmed circuitry. Processing circuitry 52 may be multi-core.

Processing circuitry 52 also includes a memory 64. Memory 64, in some embodiments, stores one or more computer programs 66 and, optionally, configuration data 68. Memory 64 provides non-transitory storage for computer program 66 and it may comprise one or more types of computer-readable media, such as disk storage, solid-state memory storage, or any mix thereof. By way of non-limiting example, memory 64 comprises any one or more of SRAM, DRAM, EEPROM, and FLASH memory, which may be in processing circuitry 52 and/or separate from processing circuitry 52. Memory 64 may also store any configuration data 68 used by wireless device 50. Processing circuitry 52 may be configured, e.g., through the use of appropriate program code stored in memory 64, to carry out one or more of the methods and/or signaling processes detailed hereinafter.

Processing circuitry 52 of wireless device 50 is configured, according to some embodiments, receive a paging message from the wireless network and perform a random access procedure in response to the paging message, where the random access procedure is performed by sending an indication of whether the UE will transmit a reply to an EDT from the wireless network to the UE.

Figure 8:
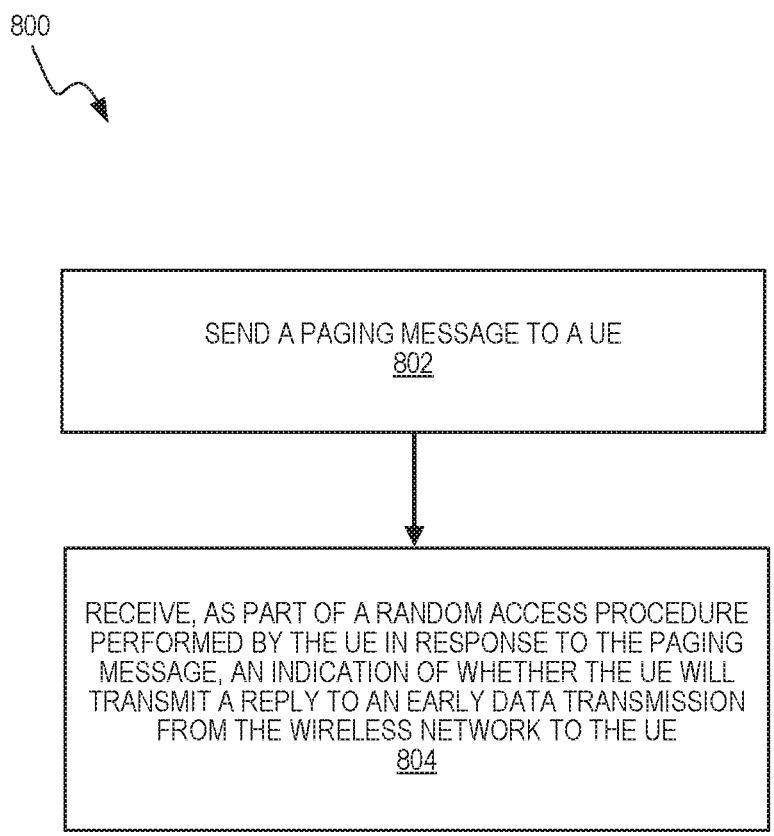
FIG. 8 illustrates a flowchart illustrating a method in the wireless device, according to some embodiments.

Processing circuitry 52 may also be configured to perform a corresponding method 800, shown in FIG. 8. Method 800 includes receiving a paging message from the wireless network (block 802) and performing a random access procedure in response to the paging message, where performing the random access procedure includes sending an indication of whether the UE will transmit a reply to an EDT from the wireless network to the UE (block 804). The paging message may include an indication of an MT EDT.

Method 800 may include determining, responsive to the indication of a mobile-terminated EDT, that the UE will transmit a reply to the EDT, and sending the indication of whether the UE will transmit a reply to the EDT may be based on the determining.

In some embodiments, sending the indication of whether the UE will transmit a reply to the EDT includes selecting a random access preamble for use in the random access procedure, the selected random access preamble indicating whether the UE will transmit a reply to the EDT. In some embodiments, sending the indication of whether the UE will transmit a reply to the EDT includes including the indication in Msg3 of the random access procedure. Including the indication in Msg3 of the random access procedure may include including a BSR in the Msg3, the codepoint of the BSR indicating whether the UE will transmit a reply to the EDT. The including may include including a release assistance indication. RAI, in the Msg3, the codepoint of the RAI indicating whether the UE will transmit a reply to the EDT. The including may include including an establishment cause field in the Msg3, the establishment cause information element indicating whether the UE will transmit a reply to the EDT. The including may include a dedicated field in the Msg3, the dedicated field element whether the UE will transmit a reply to the EDT. The including may include the indication in a MAC subheader or CE.

In some embodiments, method 800 includes receiving the EDT from the wireless network and transmitting a reply to the EDT.

Figure 9:
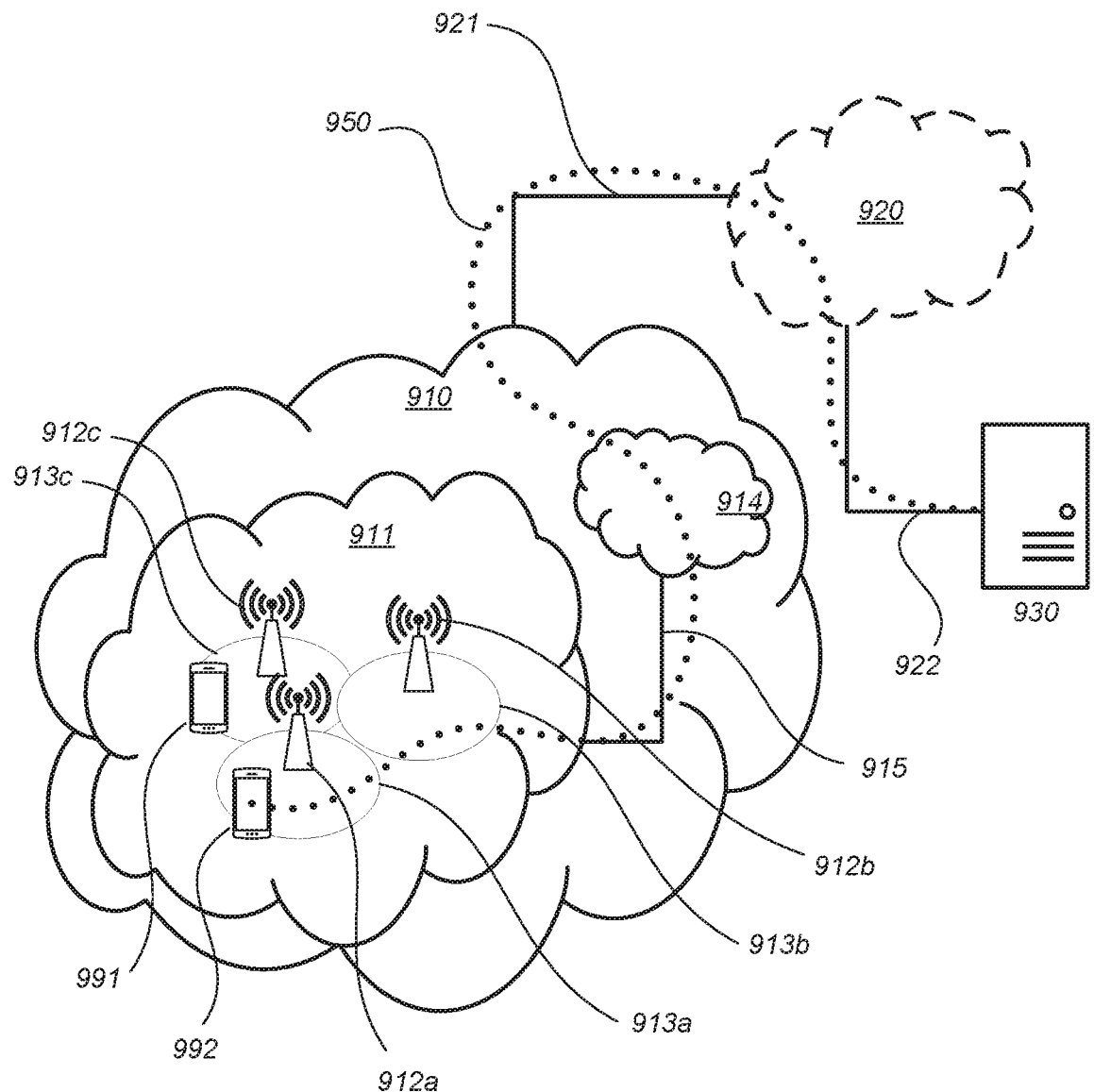
FIG. 9 schematically illustrates a telecommunication network connected via an intermediate network to a host computer, according to some embodiments.

FIG. 9, according to some embodiments, illustrates a communication system that includes a telecommunication network 910, such as a 3GPP-type cellular network, which comprises an access network 911, such as a radio access network, and a core network 914. The access network 911 comprises a plurality of base stations 912*a*. 912*b*. 912*c*, such as NBs. eNBs, gNBs or other types of wireless access points, each defining a corresponding coverage area 913*a*, 913*b*, 913*c*. Each base station 912*a*, 912*b*. 912*c* is connectable to the core network 914 over a wired or wireless connection 915. A first UE 971 located in coverage area 913*c* is configured to wirelessly connect to, or be paged by, the corresponding base station 912*c*. A second UE 992 in coverage area 913*a* is wirelessly connectable to the corresponding base station 912*a*. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 914 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between one of the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 912 may not or need not be informed about the past routing of an incoming downlink communication with data originating from a host computer 930 to be forwarded (e.g., handed over) to a connected UE 991. Similarly, the base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with a UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes processing circuitry 1028, which may comprise one or more programmable processors, application-specific integrated circuits, field programmable gate arrays or combinations of these (not shown) adapted to execute instructions.

The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
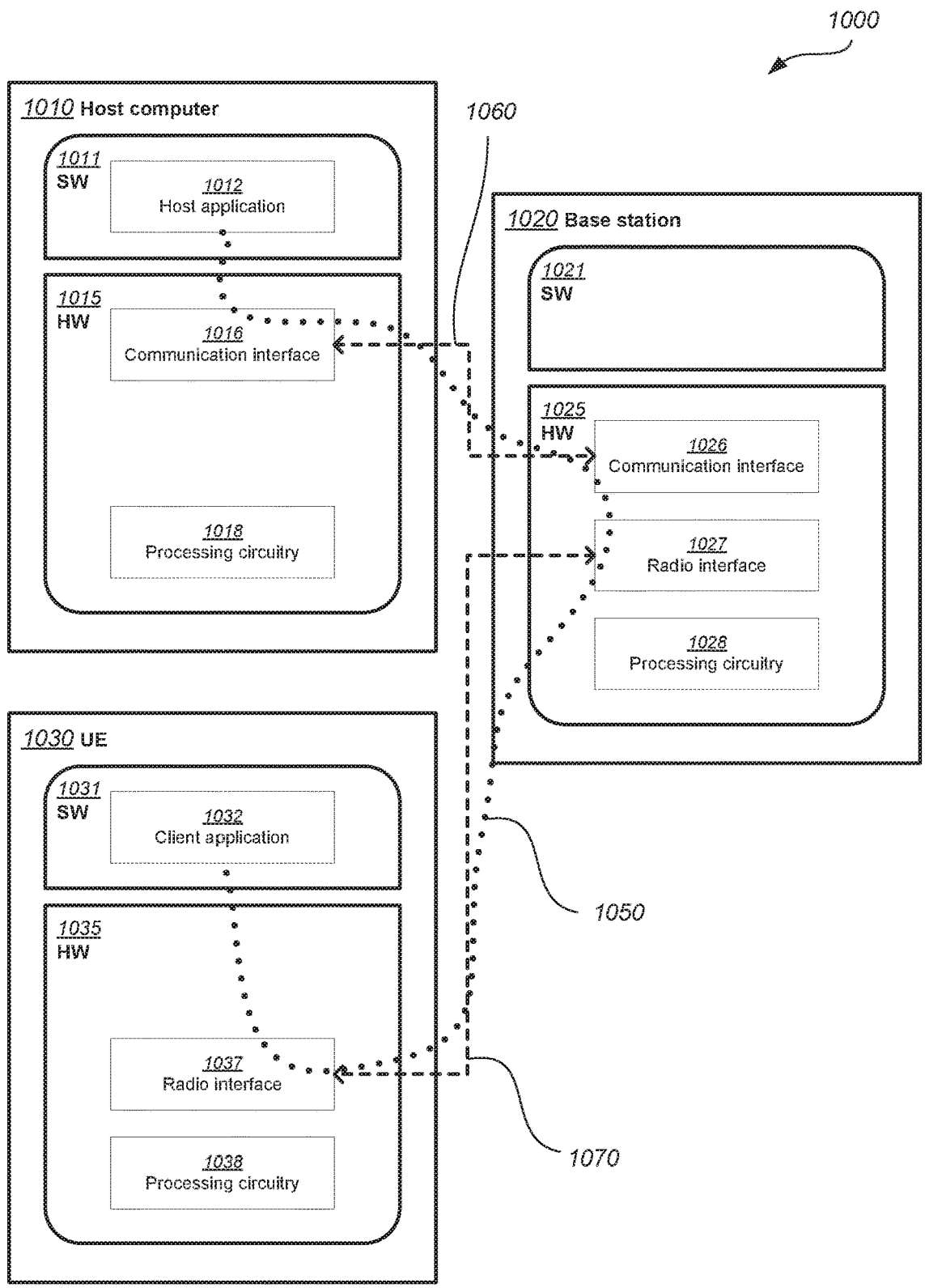
FIG. 10 is a generalized block diagram of a host computer communicating via a base station with a user equipment over a partially wireless connection, according to some embodiments.

It is noted that the host computer 1010, base station 1020 and UE 1030 illustrated in FIG. 10 may be identical to the host computer 930, one of the base stations 912*a*, 912*b*, 912*c* and one of the UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the use equipment 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure, such as provided by nodes such as wireless device 50 and network node 30, along with the corresponding methods 600 and 800. The embodiments described herein enable UEs to indicate to a network node during MT EDT if the UE expects to reply to the received MT data transmission, in order to provide eNB/network information if uplink data is expected. The teachings of these embodiments may improve the reliability, quality, latency and/or power consumption for the network and UE 1030 using the OTT connection 1050.

A measurement procedure may be provided for the purpose of monitoring data rate, latency and other factors on which the one or more embodiments improve. There may further be an optional network functionality for reconfiguring the OTT connection 1050 between the host computer 1010 and UE 1030, in response to variations in the measurement results. The measurement procedure and/or the network functionality for reconfiguring the OTT connection 1050 may be implemented in the software 1011 of the host computer 1010 or in the software 1031 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 1011, 1031 causes messages to be transmitted, in particular empty or 'dummy' messages, using the OTT connection 1050 while it monitors propagation times, errors etc.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1140, the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 1210 of the method, the host computer provides user data. In an optional substep (not shown) the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission.

Figures 13, 14:
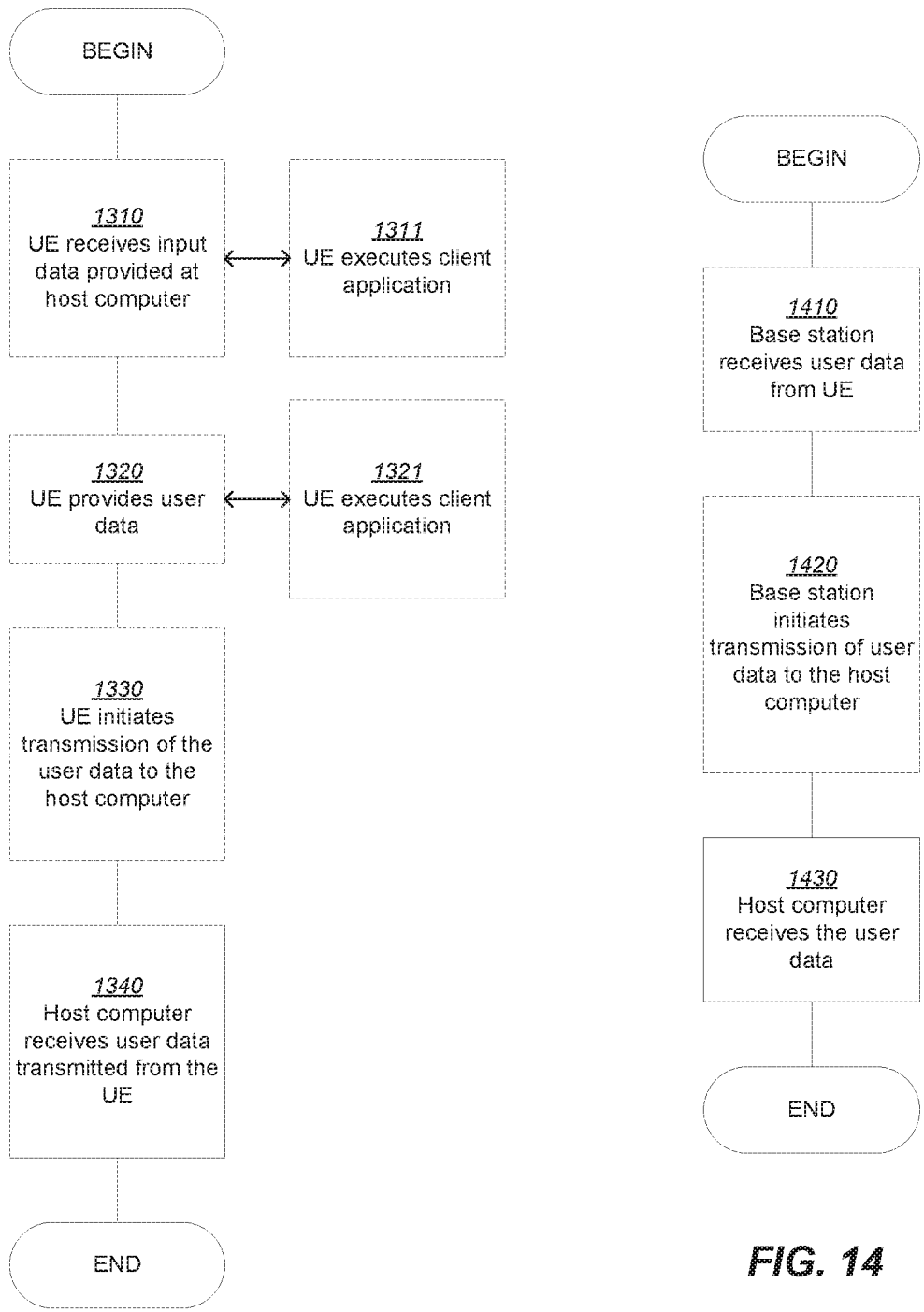

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 1310 of the method, the UE receives input data provided by the host computer. Additionally. or alternatively, in an optional second step 1320, the UE provides user data. In an optional substep 1321 of the second step 1320, the UE provides the user data by executing a client application. In a further optional substep 1311 of the first step 1310, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1330, transmission of the user data to the host computer. In a fourth step 1340 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In an optional first step 1410 of the method, in accordance with the teachings of the embodiments described throughout this disclosure, the base station receives user data from the UE. In an optional second step 1420, the base station initiates transmission of the received user data to the host computer. In a third step 1430, the host computer receives the user data carried in the transmission initiated by the base station.

As discussed in detail above, the techniques described herein, e.g., as illustrated in the process flow diagrams of FIGS. 6 and 8, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 15:
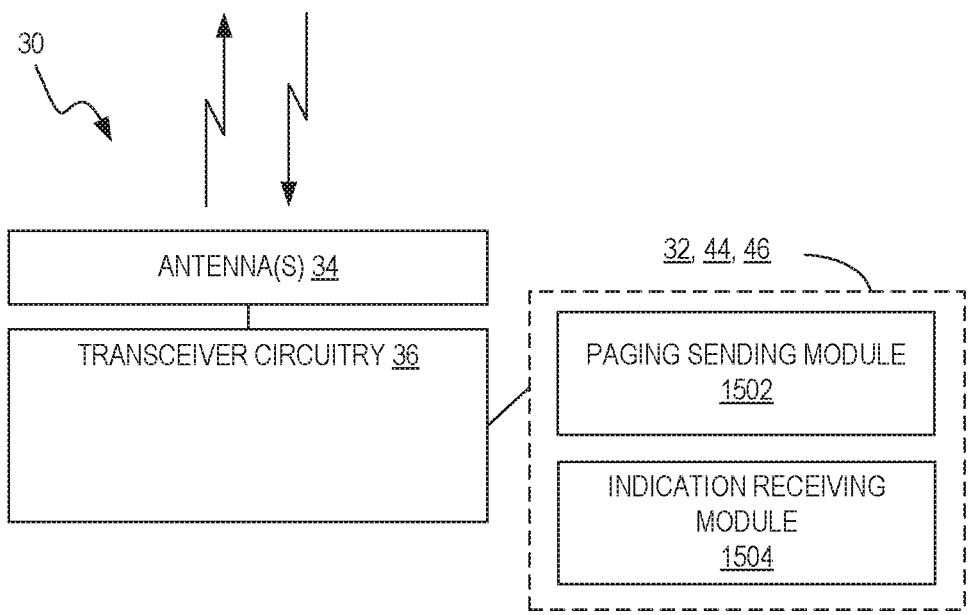
FIG. 15 is a block diagram illustrating a functional implementation of a network node, according to some embodiments.

FIG. 15 illustrates an example functional module or circuit architecture for network node 30 that includes a paging sending module 1502 for sending a paging message to a UE and an indication receiving module 1504 for receiving, as part of a random access procedure performed by the UE in response to the paging message, an indication of whether the UE will transmit a reply to an early data transmission from the wireless network to the UE.

Figure 16:
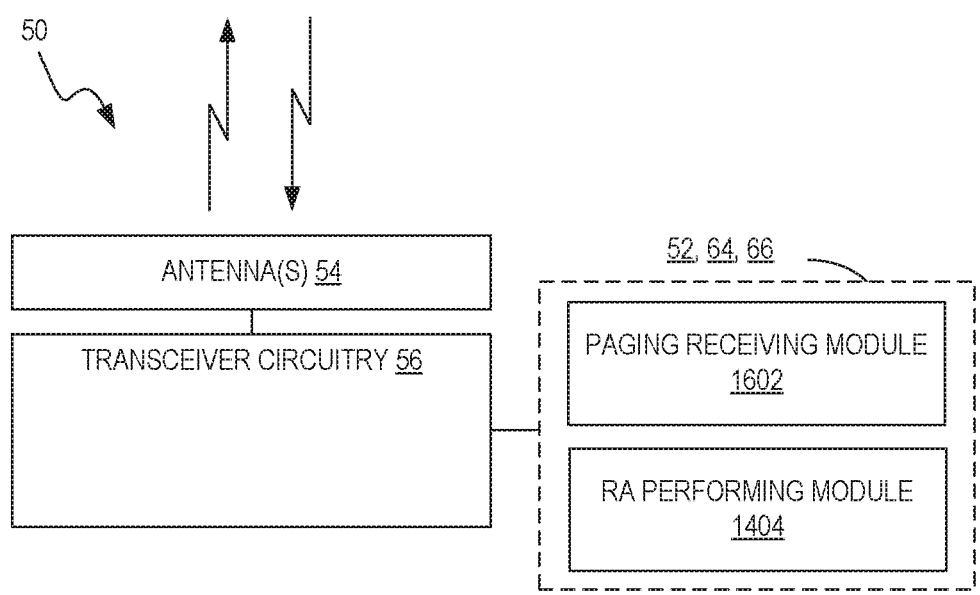
FIG. 16 is a block diagram illustrating another functional implementation of a wireless device, according to some embodiments.

FIG. 16 illustrates another example functional module or circuit architecture for wireless device 50 that includes a paging receiving module 1602 for receiving a paging message from the wireless network and an RA performing module 1604 for performing a random access procedure in response to the paging message, where performing the random access procedure includes sending an indication of whether the UE will transmit a reply to an early data transmission from the wireless network to the UE.

EXAMPLE EMBODIMENTS

Example embodiments can include, but are not limited to, the following enumerated examples:

1. A method, in a user equipment, UE, operating in a wireless network, the method comprising:
   receiving a paging message from the wireless network; and
   performing a random access procedure in response to the paging message, wherein performing the random access procedure includes sending an indication of whether the UE will transmit a reply to an early data transmission from the wireless network to the UE.

2. The method of example embodiment 1, wherein the paging message includes an indication of a mobile-terminated early data transmission.

3. The method of example embodiment 2, wherein the method further comprises determining, responsive to the indication of a mobile-terminated early data transmission, that the UE will transmit a reply to the early data transmission, and wherein sending the indication of whether the UE will transmit a reply to the early data transmission is based on said determining.

4. The method of any of example embodiments 1-3, wherein sending the indication of whether the UE will transmit a reply to the early data transmission comprises selecting a random access preamble for use in the random access procedure, the selected random access preamble indicating whether the UE will transmit a reply to the early data transmission.

5. The method of any of example embodiments 1-3, wherein sending the indication of whether the UE will transmit a reply to the early data transmission comprises including the indication in Msg3 of the random access procedure.

6. The method of example embodiment 5, wherein including the indication in Msg3 of the random access procedure comprises including a buffer status report, BSR, in the Msg3, the codepoint of the BSR indicating whether the UE will transmit a reply to the early data transmission.

7. The method of example embodiment 5, wherein including the indication in Msg3 of the random access procedure comprises including a release assistance indication, RAI, in the Msg3, the codepoint of the RAI indicating whether the UE will transmit a reply to the early data transmission.

8. The method of example embodiment 5, wherein including the indication in Msg3 of the random access procedure comprises including an establishment cause field in the Msg3, the establishment cause information element indicating whether the UE will transmit a reply to the early data transmission.

9. The method of example embodiment 5, wherein including the indication in Msg3 of the random access procedure comprises including a dedicated field in the Msg3, the dedicated field element whether the UE will transmit a reply to the early data transmission.

10. The method of example embodiment 5, wherein including the indication in Msg3 of the random access procedure comprises including the indication in a Medium Access Control, MAC, subheader or control element, CE.

11. The method of any of example embodiments 1-10, wherein the method further comprises receiving the early data transmission from the wireless network and transmitting a reply to the early data transmission.

12. A method, in a network node operating in a wireless network, the method comprising:
   sending a paging message to a user equipment, UE; and
   receiving, as part of a random access procedure performed by the UE in response to the paging message, an indication of whether the UE will transmit a reply to an early data transmission from the wireless network to the UE.

13. The method of example embodiment 12, wherein the paging message includes an indication of a mobile-terminated early data transmission.

14. The method of any of example embodiments 12 or 13, wherein receiving the indication of whether the UE will transmit a reply to the early data transmission comprises determining whether the UE will transmit a reply to the early data transmission based on a random access preamble used by the UE in the random access procedure.

15. The method of any of example embodiments 12-14, wherein receiving the indication of whether the UE will transmit a reply to the early data transmission comprises receiving the indication in Msg3 of the random access procedure.

16. The method of example embodiment 15, wherein receiving the indication in Msg3 of the random access procedure comprises receiving a buffer status report, BSR, in the Msg3, the codepoint of the BSR indicating whether the UE will transmit a reply to the early data transmission.

17. The method of example embodiment 15, wherein receiving the indication in Msg3 of the random access procedure comprises receiving a release assistance indication, RAI, in the Msg3, the codepoint of the RAI indicating whether the UE will transmit a reply to the early data transmission.

18. The method of example embodiment 15, wherein receiving the indication in Msg3 of the random access procedure comprises receiving an establishment cause field in the Msg3, the establishment cause information element indicating whether the UE will transmit a reply to the early data transmission.

19. The method of example embodiment 15, wherein receiving the indication in Msg3 of the random access procedure comprises receiving a dedicated field in the Msg3, the dedicated field element whether the UE will transmit a reply to the early data transmission.

20. The method of example embodiment 15, wherein receiving the indication in Msg3 of the random access procedure comprises receiving the indication in a Medium Access Control, MAC, subheader or control element, CE.

21. The method of any of example embodiments 12-20, further comprising:
sending the early data transmission to the UE; and
responsive to determining, based on the indication, that the UE will transmit a reply to the early data transmission, setting an uplink grant size that takes into account that the UE will transmit a reply to the early data transmission.

22. The method of any of example embodiments 12-20, further comprising:
sending the early data transmission to the UE; and
responsive to determining, based on the indication, that the UE will not transmit a reply to the early data transmission, releasing the UE to idle state in a same message that includes the early data transmission.

23. The method of any of example embodiments 12-20, further comprising:
sending the early data transmission to the UE in a Msg4 of the random access procedure;
receiving the reply to the early data transmission after the Msg4; and
releasing the UE to idle immediately after receiving the reply to the early data transmission, in response to determining that the indication that the UE will transmit a reply to the early data transmission indicates that only a single transmission by the UE will follow the early data transmission.

24. A wireless device adapted to perform the methods of any of example embodiments 1-11.

25. A wireless device comprising transceiver circuitry and processing circuitry operatively associated with the transceiver circuitry and configured to perform the methods of any of example embodiments 1-11.

26. A network node adapted to perform the methods of any of example embodiments 12-23.

27. A network node comprising transceiver circuitry and processing circuitry operatively associated with the transceiver circuitry and configured to perform the methods of any of example embodiments 12-23.

28. A computer program comprising instructions that, when executed on at least one processing circuit, cause the at least one processing circuit to carry out the method according to any one of example embodiments 1-23.

29. A carrier containing the computer program of example embodiment 28, wherein the carrier is one of an electronic signal, optical signal, radio signal, or computer readable storage medium.

A1. A communication system including a host computer comprising:
processing circuitry configured to provide user data; and
a communication interface configured to forward the user data to a cellular network for transmission to a user equipment (UE), wherein the cellular network comprises a base station having a radio interface and processing circuitry, the base station's processing circuitry configured to perform any of the operations comprising embodiments 1-23.

A2. The communication system of the previous embodiment further including the base station.

A3. The communication system of the previous two embodiments, further including the UE, wherein the UE is configured to communicate with the base station.

A4. The communication system of the previous three embodiments, wherein:
the processing circuitry of the host computer is configured to execute a host application, thereby providing the user data; and
the UE comprises processing circuitry configured to execute a client application associated with the host application.

A5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of embodiments 1-23.

A6. The method of the previous embodiment, further comprising, at the base station, transmitting the user data.

A7. The method of the previous 2 embodiments, wherein the user data is provided at the host computer by executing a host application, the method further comprising, at the UE, executing a client application associated with the host application.

A8. A user equipment (UE) configured to communicate with a base station, the UE comprising a radio interface and processing circuitry configured to perform any of the previous 3 embodiments.

A9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of embodiments 1-23.

A10. The communication system of the previous embodiment, wherein the cellular network further includes a base station configured to communicate with the UE.

A11. The communication system of the previous 2 embodiments, wherein:

the processing circuitry of the host computer is configured to execute a host application, thereby providing the user data; and the UE's processing circuitry is configured to execute a client application associated with the host application.

A12. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of embodiments 1-23.

A13. The method of the previous embodiment, further comprising at the UE, receiving the user data from the base station.

A14. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of embodiments 1-23.

A15. The communication system of the previous embodiment, further including the UE.

A16. The communication system of the previous 2 embodiments, further including the base station, wherein the base station comprises a radio interface configured to communicate with the UE and a communication interface configured to forward to the host computer the user data carried by a transmission from the UE to the base station.

A17. The communication system of the previous 3 embodiments, wherein:

the processing circuitry of the host computer is configured to execute a host application; and the UE's processing circuitry is configured to execute a client application associated with the host application, thereby providing the user data.

A18. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

A19. A method implemented in a communication system including a host computer, a base station and a user equipment (UE), the method comprising:

at the host computer, receiving user data transmitted to the base station from the UE, wherein the UE performs any of the steps of any of embodiments 1-23.

A20. The method of the previous embodiment, further comprising, at the UE, providing the user data to the base station.

A21. The method of the previous 2 embodiments, further comprising:

at the UE, executing a client application, thereby providing the user data to be transmitted; and at the host computer, executing a host application associated with the client application.

A22. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

A23. A communication system including a host computer comprising a communication interface configured to receive user data originating from a transmission from a User equipment (UE) to a base station, the base station comprising a radio interface and processing circuitry configured to communicate with the base station and cooperatively perform operations of any of embodiments 1-23.

A24. The communication system of the previous embodiment further including the base station.

A25. The communication system of the previous two embodiments, further including the UE, wherein the UE is configured to communicate with the base station.

A26. The communication system of the previous three embodiments, wherein:

the processing circuitry of the host computer is configured to execute a host application; and the UE is further configured to execute a client application associated with the host application, thereby providing the user data to be received by the host computer.

A27. A method implemented in a communication system including a host computer, a base station and a user equipment (UE), the method comprising:

at the host computer, receiving, from the base station, user data originating from a transmission which the base station has received from the UE, wherein the UE performs any of the steps of any of embodiments 1-23.

A28. The method of the previous embodiment, further comprising at the base station, receiving the user data from the UE.

A29. The method of the previous 2 embodiments, further comprising at the base station, initiating a transmission of the received user data to the host computer.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method, in a user equipment (UE) operating in a wireless network, the method comprising:

receiving a paging message from the wireless network; and performing a random access procedure in response to the paging message, wherein performing the random access procedure includes sending an indication of whether the UE will transmit a reply to an early data transmission from the wireless network to the UE.

2. The method of claim 1, wherein the paging message includes an indication of a mobile-terminated early data transmission.

3. The method of claim 2, wherein the method further comprises determining, responsive to the indication of a mobile-terminated early data transmission, that the UE will transmit a reply to the early data transmission, and wherein sending the indication of whether the UE will transmit a reply to the early data transmission is based on said determining.

4. The method of claim 1, wherein sending the indication of whether the UE will transmit a reply to the early data transmission comprises selecting a random access preamble for use in the random access procedure, the selected random access preamble indicating whether the UE will transmit a reply to the early data transmission.

5. The method of claim 1, wherein sending the indication of whether the UE will transmit a reply to the early data transmission comprises including the indication in Msg3 of the random access procedure.

6. The method of claim 5, wherein including the indication in Msg3 of the random access procedure comprises including the indication in a Medium Access Control (MAC) subheader or control element (CE).

7. The method of claim 5, wherein including the indication in Msg3 of the random access procedure comprises including a release assistance indication (RAI) in the Msg3, the codepoint of the RAI indicating whether the UE will transmit a reply to the early data transmission.

8. The method of claim 5, wherein including the indication in Msg3 of the random access procedure comprises including a buffer status report (BSR) in the Msg3, the codepoint of the BSR indicating whether the UE will transmit a reply to the early data transmission.

9. The method of claim 5, wherein including the indication in Msg3 of the random access procedure comprises including an establishment cause field in the Msg3, the establishment cause information element indicating whether the UE will transmit a reply to the early data transmission.

10. The method of claim 5, wherein including the indication in Msg3 of the random access procedure comprises including a dedicated field in the Msg3, the dedicated field element whether the UE will transmit a reply to the early data transmission.

11. The method of claim 1, wherein the method further comprises receiving the early data transmission from the wireless network and transmitting a reply to the early data transmission.

12. A method, in a network node operating in a wireless network, the method comprising:
sending a paging message to a user equipment (UE); and
receiving, as part of a random access procedure performed by the UE in response to the paging message, an indication of whether the UE will transmit a reply to an early data transmission from the wireless network to the UE.

13. The method of claim 12, wherein the paging message includes an indication of a mobile-terminated early data transmission.

14. The method of claim 12, wherein receiving the indication of whether the UE will transmit a reply to the early data transmission comprises determining whether the UE will transmit a reply to the early data transmission based on a random access preamble used by the UE in the random access procedure.

15. The method of claim 12, wherein receiving the indication of whether the UE will transmit a reply to the early data transmission comprises receiving the indication in Msg3 of the random access procedure.

16. The method of claim 15, wherein receiving the indication in Msg3 of the random access procedure comprises receiving the indication in a Medium Access Control (MAC) subheader or control element (CE).

17. The method of claim 15, wherein receiving the indication in Msg3 of the random access procedure comprises receiving a release assistance indication (RAI) in the Msg3, the codepoint of the RAI indicating whether the UE will transmit a reply to the early data transmission.

18. The method of claim 15, wherein receiving the indication in Msg3 of the random access procedure comprises receiving a buffer status report (BSR) in the Msg3, the codepoint of the BSR indicating whether the UE will transmit a reply to the early data transmission.

19. The method of claim 15, wherein receiving the indication in Msg3 of the random access procedure comprises receiving an establishment cause field in the Msg3, the establishment cause information element indicating whether the UE will transmit a reply to the early data transmission.

20. The method of claim 15, wherein receiving the indication in Msg3 of the random access procedure comprises receiving a dedicated field in the Msg3, the dedicated field element whether the UE will transmit a reply to the early data transmission.

21. The method of claim 12, further comprising:
sending the early data transmission to the UE; and
responsive to determining, based on the indication, that the UE will transmit a reply to the early data transmission, setting an uplink grant size that takes into account that the UE will transmit a reply to the early data transmission.

22. The method of claim 12, further comprising:
sending the early data transmission to the UE; and
responsive to determining, based on the indication, that the UE will not transmit a reply to the early data transmission, releasing the UE to idle state in a same message that includes the early data transmission.

23. The method of claim 12, further comprising:
sending the early data transmission to the UE in a Msg4 of the random access procedure;
receiving the reply to the early data transmission after the Msg4; and
releasing the UE to idle immediately after receiving the reply to the early data transmission, in response to determining that the indication that the UE will transmit a reply to the early data transmission indicates that only a single transmission by the UE will follow the early data transmission.

24. A wireless device comprising transceiver circuitry and processing circuitry operatively associated with the transceiver circuitry and configured to:
receive a paging message from the wireless network, via the transceiver circuitry; and
performing a random access procedure in response to the paging message, using the transceiver circuitry, wherein performing the random access procedure includes sending an indication of whether the UE will transmit a reply to an early data transmission from the wireless network to the UE.

25. The wireless device of claim 24, wherein the paging message includes an indication of a mobile-terminated early data transmission, and wherein the processing circuitry is further configured to determine, responsive to the indication of a mobile-terminated early data transmission, that the UE will transmit a reply to the early data transmission and send the indication of whether the UE will transmit a reply to the early data transmission based on said determining.

26. A network node comprising transceiver circuitry and processing circuitry operatively associated with the transceiver circuitry and configured to:
send a paging message to a user equipment (UE), using the transceiver circuitry; and
receiving, using the transceiver circuitry and as part of a random access procedure performed by the UE in response to the paging message, an indication of whether the UE will transmit a reply to an early data transmission from the wireless network to the UE.

* * * * *